United States Patent
Guzik et al.

(10) Patent No.: US 12,095,864 B2
(45) Date of Patent: *Sep. 17, 2024

(54) DEVICE MANAGEMENT DURING EMERGENT CONDITIONS

(71) Applicants: Getac Technology Corporation, New Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, New Taipei (TW); WHP Workflow Solutions, Inc., North Charleston, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/373,946

(22) Filed: Sep. 27, 2023

(65) Prior Publication Data
US 2024/0121307 A1  Apr. 11, 2024

Related U.S. Application Data

(63) Continuation of application No. 17/962,213, filed on Oct. 7, 2022, now Pat. No. 11,818,217.

(51) Int. Cl.
*H04L 67/125* (2022.01)
*H04N 23/661* (2023.01)
*H04W 84/12* (2009.01)

(52) U.S. Cl.
CPC .......... *H04L 67/125* (2013.01); *H04N 23/661* (2023.01); *H04W 84/12* (2013.01)

(58) Field of Classification Search
CPC .... H04L 67/125; H04N 23/661; H04N 7/188; H04N 23/60; H04N 23/90; H04W 84/12
See application file for complete search history.

(56) References Cited

U.S. PATENT DOCUMENTS 10,922,547 B1 *  2/2021  Siminoff .............. H04N 23/661
11,394,758 B1 *  7/2022  Gupta ..................... H04L 65/80
(Continued)

OTHER PUBLICATIONS

U.S. Appl. No. 17/962,213, Notice of Allowance mailed Jul. 11, 2023, 30 pages.
(Continued)

*Primary Examiner* — Javier O Guzman
(74) *Attorney, Agent, or Firm* — Finnegan Henderson Farabow, Garrett & Dunner, L.L.P.

(57) ABSTRACT

Methods, systems, and apparatus, including computer programs encoded on a computer storage medium, to manage devices during emergent conditions are disclosed. In one aspect, a method includes the actions of receiving, by a first computing device, data indicating a function of a second computing device. The actions further include determining, by the first computing device, a context of the second computing device. Based on the context of the second computing device, the actions further include determining, by the first computing device, whether to activate the function of the second computing device. Based on determining whether to activate the function of the second computing device, the actions further include determining, by the first computing device, whether to output, to the second computing device, an instruction to activate the function.

20 Claims, 3 Drawing Sheets

(56) References Cited

U.S. PATENT DOCUMENTS

| | | |
|---|---|---|
| 11,979,223 B2 * | 5/2024 | Shirane .................. H04H 20/14 |
| 2006/0199536 A1 | 9/2006 | Eisenbach |
| 2011/0047214 A1 * | 2/2011 | Lee ..................... H04L 12/2809 |
| | | 709/204 |
| 2015/0070376 A1 * | 3/2015 | Fujine ..................... G09G 3/36 |
| | | 345/589 |
| 2016/0381111 A1 * | 12/2016 | Barnett .................. H04L 65/75 |
| | | 709/231 |
| 2019/0013025 A1 * | 1/2019 | Alcorn .................... G10L 15/22 |
| 2019/0182749 A1 | 6/2019 | Breaux et al. |
| 2019/0288916 A1 | 9/2019 | Ricci |
| 2019/0373532 A1 * | 12/2019 | Juhasz ................. H04W 48/10 |
| 2020/0077250 A1 * | 3/2020 | Gideon, III ........ G06Q 30/0205 |
| 2021/0233376 A1 * | 7/2021 | Darling ............. G08B 21/0446 |
| 2021/0337460 A1 * | 10/2021 | Breaux, III ............. H04W 8/18 |

OTHER PUBLICATIONS

2 U.S. Appl. No. 17/962,213, Office Action mailed Mar. 9, 2023, 27 pages.

* cited by examiner

DEVICE MANAGEMENT DURING EMERGENT CONDITIONS

CROSS-REFERENCE TO RELATED APPLICATION

This application is a continuation of U.S. application Ser. No. 17/962,213, filed Oct. 7, 2022, which is incorporated by reference.

TECHNICAL FIELD

This specification generally relates to remotely controlling the functionality of devices.

BACKGROUND

Police officers carry various types of equipment on their person and in their vehicles. Each of these devices may perform various functions. For example, a body camera may be configured to record audio and video. A radio may be configured to transmit and receive audio. A mobile phone may be configured to transmit and receive data over a network.

SUMMARY

A police officer carries multiple devices on his or her person in the course of duty. These devices form a personal area network for the officer. While many, and sometimes all, of these devices typically run in a low-functionality state, in high priority, high risk, and/or emergent conditions it may be important for some or all of the devices to immediately transition to a full-functionality state. With multiple devices, it may be impractical, if not impossible, to manually activate full functionality on each device, especially in fast moving, high-priority, and/or high-stress conditions.

A hub is communicatively coupled to the various devices in the officer's personal area network. The hub is aware of the functionality of the various devices in the personal area network. The hub may be located in a vehicle of the officer or on the officer's person. The hub may communicate with the various devices to control when their various services are needed or not needed. Under high-priority, high-stress or high-danger, and/or emergent conditions, the hub may be configured to automatically elevate the functionality activation level of some or all of the federated devices. There may be times that not all devices need to be fully functional, and the hub may be configured to make this determination. The determination of which devices to activate may be based on priority levels, emergent threats, and any other similar context. The hub may make this determination as an officer enters a geographic area of an ongoing event. In some implementations, an officer can override the automatic decisions of the hub. For example, the officer may override the hub to initiate full functionality on a device. There may also be instances where the officer may override the hub to reduce the functionality of a device as may be the case with privacy issues.

An innovative aspect of the subject matter described in this specification may be implemented in methods that include the actions of receiving, by a first computing device, data indicating a function of a second computing device; determining, by the first computing device, a context of the second computing device; based on the context of the second computing device, determining, by the first computing device, whether to activate the function of the second computing device; and based on determining whether to activate the function of the second computing device, determining, by the first computing device, whether to output, to the second computing device, an instruction to activate the function.

These and other implementations can each optionally include one or more of the following features. The actions of determining whether to activate the function of the second computing device includes determining to activate the function of the second computing device. The action of determining whether to output the instruction to activate the function includes determining to output, to the second computing device, the instruction to activate the function. The action of determining whether to activate the function of the second computing device includes determining to suppress the function of the second computing device. The action of determining whether to output the instruction to activate the function includes determining to output, to the second computing device, the instruction to suppress the function. The actions further include determining a context of the first computing device. The actin of determining whether to activate the function of the second computing device is further based on the context of the first computing device.

The actions further include determining, by the first computing device, characteristics of the second computing device. The action of determining whether to activate the function of the second computing device is further based on the characteristics of the second computing device. The actions further include receiving, by the first computing device, data indicating an additional function of a third computing device; determining, by the first computing device, a context of the third computing device; based on the context of the second computing device and the context of the third computing device, determining, by the first computing device, whether to activate the additional function of the third computing device; and based on determining whether to activate the additional function of the third computing device, determining, by the first computing device, whether to output, to the third computing device, an instruction to activate the additional function.

The actions further include determining, by the first computing device, that the function and the additional function are a same function. The action of determining whether to activate the function of the second computing device is further based on the function and the additional function being the same function. The action of determining whether to activate the additional function of the third computing device is further based on the function and the additional function being the same function. The actions further include determining, by the first computing device, a first quality of first function data that is generated by the function; and determining, by the first computing device, a second quality of the second function data that is generated by the additional function. The action of determining whether to activate the function of the second computing device is further based on the first quality of first function data that is generated by the function and the second quality of the second function data that is generated by the additional function.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. The hub manages connected devices in a personal area network, including suspending and activating functionality of each device in accordance with any given context and other factors. The hub maintains a messaging broker to communicate with the connected devices. The hub maintains functionality of the personal area network. The hub activates and deactivates the functionality of the connected devices based on emergent conditions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
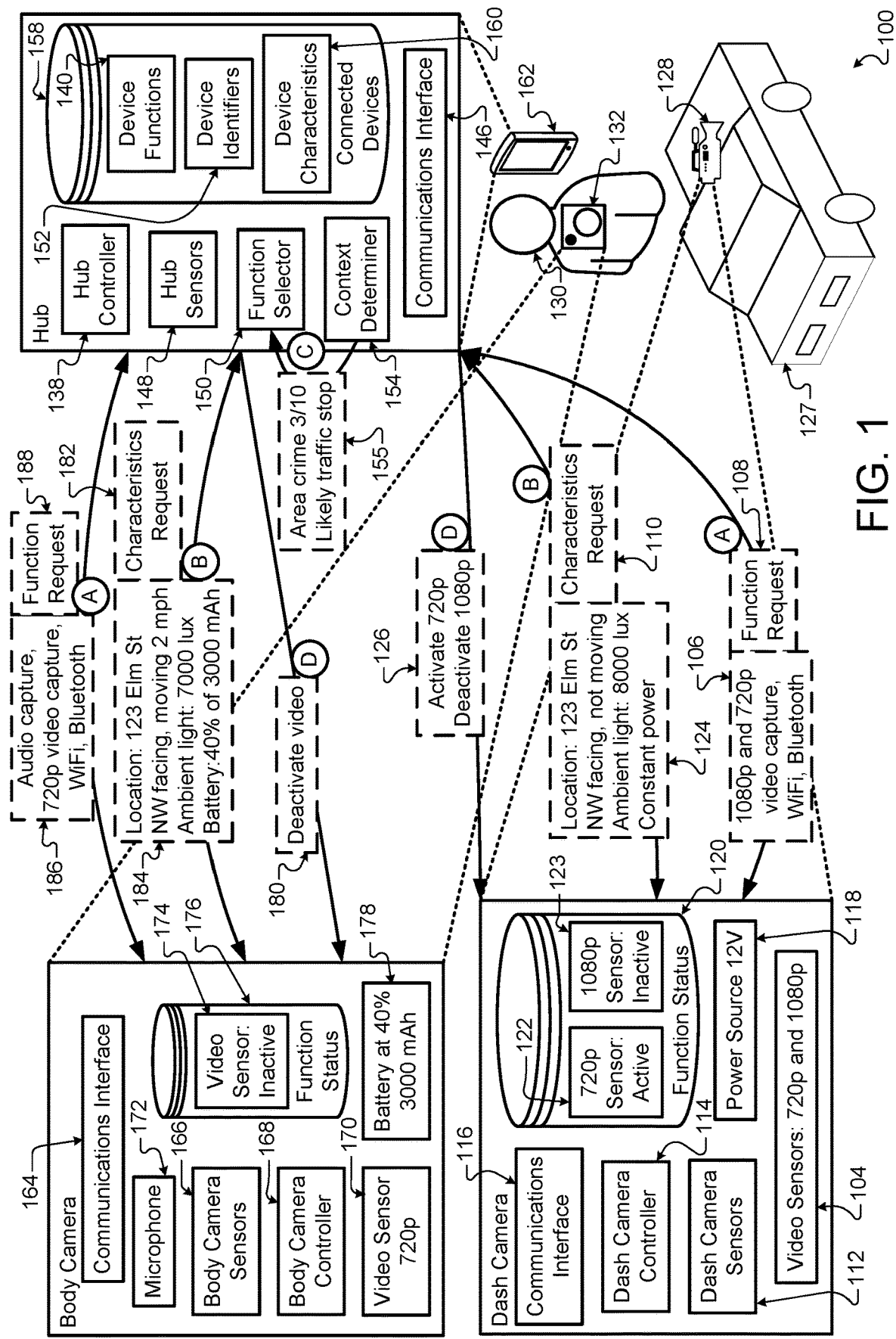
FIG. 1 illustrates an example system that is configured to manage the functionality of various devices.

FIG. 1 illustrates an example system 100 that is configured to manage the functionality of various devices. Briefly, and as described in more detail below, the user 130 may be utilizing multiple devices. These devices may include a body camera 132, a dashboard camera 128, and a mobile phone 162. The mobile phone 162 may operate as a hub that is configured to manage the operations of the body camera 132, the dashboard camera 128, and any other connected devices. The mobile phone 162 may determine the various functions of the body camera 132 and the dashboard camera 128 and determine when the functions should be active, inactive, and/or operating normally. The mobile phone 162 may make this determination based on the context of one or more of the connected devices. FIG. 1 includes various stages A through D that may illustrate the performance of actions and/or the movement of data between various components of the system 100. The system 100 may perform these stages in any order.

In more detail, the user 130 may be a police officer who is carrying various types of equipment in the vehicle 127 of the user 130 and the body of the user 130. The equipment may include a dashboard camera 128 that include video sensors 104 that can generate 720p or 1080p video, and a communications interface 116. The communications interface 116 may be configured to transmit and receive video communications using various techniques. These techniques may include radio frequency communications, Wi-Fi, short range radio, cellular communications, and/or any other similar wireless or wired communication technique. The video sensors 104 may be configured to generate video data and transmit that video data to the communications interface 116. The video sensors 104 may generate the video data in 720p and/or 1080p resolution depending in the instructions from the dashboard camera controller 114. The video sensors 104 may include a sensor for each of the different resolutions or may include a single sensor with higher resolution where the video data is reduced to a lower resolution. The communications interface 116 may output the video data to another device and/or a communications network.

The dashboard camera 128 may include dashboard camera sensors 112 that are configured to detect various characteristics of the dashboard camera 128 and/or the environment of the dashboard camera 128. For example, the dashboard camera sensors 112 may include an accelerometer, a gyroscope, a GPS receiver, a barometer, an ambient light sensor, a compass, a gravity sensor, a proximity sensor, a magnetometer, hygrometer, water sensor, solar flux sensor, ultraviolet light detector, and/or any other similar sensors. The dashboard camera 128 may be located in the vehicle 127 and may include a power supply 118 that is hardwired to a twelve volt power source. The dashboard camera 128 may be configured to receive power from another device such as a battery and/or any other hardwired power supply. The power supply 118 may provide the power to the various components of the radio 128.

The dashboard camera 128 may include a dashboard camera controller 114 that is configured to manage the various components of the dashboard camera 128. The dashboard camera controller 114 may be implemented by one or more processors executing software stored on a storage device accessible by the processors. The dashboard camera controller 114 may manage the processing of the video data generated by the video sensors 104 and during the communications interface 116 outputting of the processed video data. The dashboard camera controller 114 may receive the sensor data from the dashboard camera sensors 112 and provide the sensor data to the various destinations that may include the communications interface 116.

In some implementations, the dashboard camera controller 114 may be configured to control whether any of the components are active or not. For example, the dashboard camera controller 114 may be configured to deactivate the video sensors 104. Deactivating the video sensors 104 may prevent the video sensors 104 from generating video data. The dashboard camera controller 114 may be configured to activate and/or deactivate one of the 1080p or 720p video sensors so that the video sensors 104 generate video data in a specific resolution. The dashboard camera controller 114 may activate or deactivate one or more of the dashboard camera sensors 112 that may prevent the deactivated dashboard camera sensor from generating sensor data. The dashboard camera controller 114 may also reactivate any of the deactivated components. The dashboard camera controller 114 may also control the techniques that the communications interface 116 may use to communicate with other devices. For example, the dashboard camera controller 114 may deactivate the Wi-Fi feature of the communications interface 116. The dashboard camera controller 114 may store the activation status of the various components in the function status 120. The function status 120 may be implemented in a storage device that is accessible by the dashboard camera controller 114.

The equipment that the user 130 may carry may also include a body camera 132. The body camera 132 may be located on the chest of the user 130. The body camera 132 may include a video sensor 170, a microphone 172, and a communications interface 164. The communications interface 164 may be configured to transmit and receive communications using various techniques. These techniques may include radio frequency communications, Wi-Fi, short range radio, cellular communications, and/or any other similar wireless or wired communication technique. The microphone 172 may be configured to detect audio. The video sensor 170 may be configured to generate video data with a resolution of 720p. The microphone 172 and the video sensor 170 may be configured to output the audio and video data to a storage device and/or a communications network using the communications interface 164. The storage device may be located on or accessible by the body camera 132.

The body camera 132 may include body camera sensors 166 that are configured to detect various characteristics of the body camera 132 and/or the environment of the body camera 132. For example, the body camera sensors 166 may include an accelerometer, a gyroscope, a GPS receiver, a barometer, an ambient light sensor, a compass, a gravity sensor, a proximity sensor, a magnetometer, hygrometer, water sensor, solar flux sensor, ultraviolet light detector, and/or any other similar sensors. The body camera 132 may include a battery 178 to provide power to the various components. The body camera 132 may be configured to receive power from another device such as a power supply, power adapter, and/or any other similar device. This power may be used to charge the battery 178. In some implementations, the body camera 132 may provide the power to the various components of the body camera 132.

The body camera 132 may include a body camera controller 168 that is configured to manage the various components of the body camera 132. The body camera controller 168 may be implemented by one or more processors executing software stored on a storage device accessible by the processors. The body camera controller 168 may manage the processing of the audio data detected by the microphone 172 before and during the communications interface 164 outputting of the processed audio data and/or storing the audio data. The body camera controller 168 may mange the processing of video data generated by the video sensor 170 before and during the communications interface 164 outputting of the processed video data and/or storing the video data. The body camera controller 168 may receive the sensor data from the body camera sensors 166 and provide the sensor data to the various destinations that may include the communications interface 164.

In some implementations, the body camera controller 168 may be configured to control whether any of the components are active or not. For example, the body camera controller 168 may be configured to deactivate the microphone 172. Deactivating the microphone 172 may prevent the microphone 172 from detecting audio. The body camera controller 168 may deactivate the video sensor 172 that may prevent the video sensor 172 from generating video data. The body camera controller 168 may deactivate one or more of the body camera sensors 166 that may prevent the deactivated body camera sensor from generating sensor data. The body camera controller 168 may also reactivate any of the deactivated components. The body camera controller 168 may also control the techniques that the communications interface 164 may use to communicate with other devices. For example, the body camera controller 168 may deactivate the short range radio feature of the communications interface 164. The body camera controller 168 may store the activation status of the various components in the function status 176. The function status 176 may be implemented in a storage device that is accessible by the body camera controller 168.

The equipment that the user 130 may carry may also include a mobile phone 162. The mobile phone 162 may include various components that facilitate the mobile phone 162 operating as a hub that manages the various components that the user 130 carries and the various components that the user 130 utilizes but may not carry, such as those components in the vehicle 127. In this way, the mobile phone 162 may manage the personal area network of the user 130. The personal area network may include the mobile phone 162, the dashboard camera 128, the body camera 132, and any other devices that mobile phone 162 may be able to manage. The mobile phone 130 includes a hub controller 138. The hub controller 138 may be implemented by one or more processors executing software stored on a storage device accessible by the processors. The hub controller 138 may be configured to manage the various components of the mobile phone 162. The components may include a communications interface 146, hub sensors 148, a function selector 150, and a context determiner 154. The communications interface 146 may be configured to transmit and receive data using various techniques. These techniques may include radio frequency communications, Wi-Fi, short range radio, cellular communications, and/or any other similar wireless or wired communication technique. The hub controller 138 may be configured to instruct the communications interface 146 to utilize a particular communications technique and/or prevent communications using a particular communications technique. For example, the hub controller 138 may instruct the communications interface 146 to deactivate the cellular communications. As another example, the hub controller 138 may instruct the communications interface 146 to only utilize short range radio.

The hub sensors 148 may include an accelerometer, a gyroscope, a GPS receiver, a barometer, an ambient light sensor, a compass, a gravity sensor, a proximity sensor, a magnetometer, image sensor, video sensor, microphone, hygrometer, water sensor, solar flux sensor, ultraviolet light detector, and/or any other similar sensors. The hub controller 138 may be configured to activate or deactivate any of the hub sensors 148. The hub controller 138 may also be configured to provide the hub sensor data to the communications interface 146 for output to a storage device and/or to another component of the mobile phone 162 for further processing.

The context determiner 154 may be configured to determine the context of the mobile phone 162, any other devices communicating with the mobile phone 162, and/or the user 130. The context determiner 154 may analyze the hub sensor data, the dashboard camera sensor data, the body camera sensor data, video data from the dashboard camera 128, function data from the dashboard camera 128, function data from the body camera 132, video and audio data from the body camera 132, and/or additional data from other devices. The context determiner 154 may determine a likely context of the mobile phone 162 and/or any other devices communicating with the mobile phone 162 based on this analysis. The context may indicate the likely actions in which the user 130 may be participating, the activities that may likely be occurring around the user 130, the likely path of the user 130, the weather around the user 130, and/or any other similar context.

The hub controller 138 may maintain a record of the devices that the hub controller 138 manages. This record may include identifiers for each of the devices and data related to each device such as the characteristics of the devices and the functions of the devices. The mobile phone 162 may include a connected devices storage 158. The connected devices storage 158 may be implemented in a storage device that is accessible by the hub controller 138. The connected devices storage 158 may include the device identifiers 152. The device identifiers 152 may include data identifying each of the devices that the mobile phone 162 is managing. In the example of FIG. 1, the device identifiers 152 may include data identifying the body camera 132 and data identifying the dashboard camera 128.

The connected devices storage 158 may include the device characteristics 160 and the device functions 140 for the devices referenced in the device identifiers 152. The device functions 140 may include data related to the capabilities of the corresponding devices. The device functions 140 may be related to the tasks that the corresponding device is configured to perform. The device may perform the function using hardware and/or software. In some implementations, the hub controller 138 may request that devices indicate, to the mobile phone 162, the functions that the corresponding devices are capable of performing. In some implementations, the devices may provide an indication of their corresponding functions upon connecting to the mobile phone 162. In some implementations, the devices may provide an indication of their corresponding functions upon an update to the functions of the device. For example, if a device receives a software update that allows the device to perform a new function, then the device may provide an indication to the mobile phone 162 indicating the new function. If a device loses a function, then the device may provide an indication to the mobile phone 162 indicating the lost function.

The device characteristics 160 may be related to the aspects of the devices that change more frequently than the functions. In some implementations, the device characteristics 160 may be related to the aspects of the devices that are not related to the devices performing an action. In some implementations, the device functions 140 may be related to the functions of the devices that may change with changes in hardware and/or software, and the device characteristics 160 may be other aspect of the devices.

In stage A, the hub controller 138 may access the device identifiers 152 and determine that the dashboard camera 128 and the body camera 132 are communicating with the mobile phone 162. The hub controller 138 may determine that the device functions 140 may not include the functions of the dashboard camera 128 and the body camera 132. In some implementations, the hub controller 138 may determine that the device functions 140 for the dashboard camera 128 and the body camera 132 have not been updated in a threshold period of time. The hub controller 138 may generate a function request 108 and provide the function request 108 to the communications interface 146 along with instructions to provide the function request 108 to the dashboard camera 128. The communications interface 146 transmits the function request 108 to the dashboard camera 128. The communications interface 116 receives the function request 108 and provides the function request 108 to the dashboard camera controller 114. The radio controller 114 determines that the functions of the dashboard camera 128 include the ability to generate video in 1080p and/or 720p, communicate using Wi-Fi, and communicate using short range radio. The dashboard camera controller 114 may generate the function response 106 that indicates these functions. The dashboard camera controller 114 may provide function response 106 to the communications interface 116 that then provides the function response 106 to the communications interface 146 of the mobile phone 162. The hub controller 138 stores the function response 106 in the device functions 140. The device functions 140 then indicate that the dashboard camera 128 has the functions of generating video in 1080p and/or 720p, communicating using Wi-Fi, and communicating using short range radio.

The hub controller 138 may generate a function request 188 and provide the function request 188 to the communications interface 146 along with instructions to provide the function request 188 to the body camera 132. The communications interface 146 transmits the function request 188 to the body camera 132. The communications interface 164 receives the function request 188 and provides the function request 188 to the body camera controller 168. The body camera controller 168 determines that the functions of the body camera 132 include the ability to capture audio, capture video with a resolution of 720p, communicate using Wi-Fi, and communicate using short range radio. The body camera controller 168 may generate the function response 186 that indicates these functions. The body camera controller 168 may provide function response 186 to the communications interface 164 that then provides the function response 186 to the communications interface 146 of the mobile phone 162. The hub controller 138 stores the function response 186 in the device functions 140. The device functions 140 then indicate that the body camera 132 has the functions of capturing audio, capturing video, communicating using Wi-Fi, and communicating using short range radio.

In stage B, the hub controller 138 may determine that the device characteristics 160 may not include the characteristics of the dashboard camera 128 and the body camera 132. In some implementations, the hub controller 138 may determine that the device characteristics 160 for the dashboard camera 128 and the body camera 132 have not been updated in a threshold period of time. The threshold period of time for the device characteristics 160 may be different than the threshold period of time for the device functions 140. For example, the threshold period of time for the device characteristics 160 may be two hours while the threshold period of time for the device functions 140 may be two weeks.

The hub controller 138 may generate a characteristics request 110 and provide the characteristics request 110 to the communications interface 146 along with instructions to provide the characteristics request 110 to the dashboard camera 128. The communications interface 146 transmits the characteristics request 110 to the dashboard camera 128. The communications interface 116 receives the characteristics request 110 and provides the characteristics request 110 to the dashboard camera controller 114. The dashboard camera controller 114 determines that the characteristics of the dashboard camera 128 include the location of the dashboard camera 128 being 123 Elm Street, the dashboard camera 128 facing northwest and not moving, the ambient light in the vicinity of the dashboard camera 128 being eight thousand lux, and the dashboard camera 128 receiving constant power. The dashboard camera controller 114 may generate the characteristics response 124 that indicates these characteristics. In some implementations, the dashboard camera controller 114 may access the sensor data generated by the dashboard camera sensors 112 in response to receiving the characteristics request 110. For example, the dashboard camera controller 114 may determine a location of the dashboard camera 128, the movement of the dashboard camera 128, and/or any other similar environmental conditions of the dashboard camera 128. The dashboard camera controller 114 may include those conditions in the characteristics response 124.

The dashboard camera controller 114 may provide characteristics response 124 to the communications interface 116 that then provides the characteristics response 124 to the communications interface 146 of the mobile phone 162. The hub controller 138 stores the characteristics response 124 in the device characteristics 160. The device characteristics 160 then indicate that the dashboard camera 128 is located at 123 Elm Street, is facing northwest, is not moving, is sensing ambient light of eight thousand lux, and is receiving constant power.

The hub controller 138 may generate a characteristics request 182 and provide the characteristics request 182 to the communications interface 146 along with instructions to provide the characteristics request 182 to the body camera 132. The communications interface 146 transmits the characteristics request 182 to the body camera 132. The communications interface 164 receives the characteristics request 182 and provides the characteristics request 182 to the body camera controller 168. The body camera controller 168 determines that the characteristics of the body camera 132 include the location of the body camera 132 being 123 Elm Street, the body camera 132 facing northwest and moving two miles per hour, the ambient light in the vicinity of the body camera 132 being seven thousand lux, and the battery 178 being a three thousand milliamp battery with forty percent remaining. The body camera controller 168 may generate the characteristics response 184 that indicates these characteristics. In some implementations, the body camera controller 168 may access the sensor data generated by the body camera sensors 166 in response to receiving the characteristics request 182. For example, the body camera controller 168 may determine a location of the body camera 132, the movement of the body camera 132, and/or any other similar environmental conditions of the body camera 132. The body camera controller 168 may include those conditions in the characteristics response 184.

The body camera controller 168 may provide characteristics response 184 to the communications interface 164 that then provides the characteristics response 184 to the communications interface 146 of the mobile phone 162. The hub controller 138 stores the characteristics response 184 in the device characteristics 160. The device characteristics 160 then indicate that the body camera 132 is located at 123 Elm Street, is facing northwest, is moving at two miles per hour, is sensing ambient light of seven thousand lux, and has a three thousand milliamp battery with forty percent remaining.

The hub controller 138 determines that the device characteristics 160 and the device functions 140 are up to date and include data that corresponds to the devices in the device identifiers 152. Based on this determination and in stage C, the hub controller 138 may instruct the context determiner 154 to determine the context of the mobile phone 162. The context determiner 154 may access the hub sensor data generated by the hub sensors 148. The context determiner 154 may also access the device identifiers 152 to determine that devices that are included in the personal area network of the user 130. The context determiner 154 may access the device characteristics 160 that may include sensor data collected by the sensors of the connected devices such as the body camera sensors 166 and the dashboard camera sensors 112. The context determiner 154 may also access public sources of information that may relate to news, weather, current event, public crime data, court records, and/or any other similar activity that may be affecting what is occurring in the vicinity of the mobile phone 162. These public sources may include websites available on the internet, public APIs, radio signals, and/or any other similar public data. The context determiner 154 may also access private data sources. The private data sources may include intranet data related to an employer of the user 130. For example, the user 130 may be a police officer and the private data may relate information related to ongoing investigations, non-public crime data, and/or any other similar internal police data.

In some implementations, the connected devices may include the built-in computer of the vehicle 127. With the vehicle 127 being a connected device, the device identifiers may include data identifying the vehicle 127 and the built-in computer of the vehicle 127. The device functions 140 may include data identifying the various functions of the vehicle 127 and the built-in computer of the vehicle 127. The device characteristics may include the various characteristics of the vehicle 127 and the built-in computer of the vehicle 127, which may also include sensor data collected from the various sensors of the vehicle 127 and the built-in computer of the vehicle 127. These sensors may include a speedometer, a location sensor, vehicle accessory monitors that may monitor the usage of various accessories of the vehicle 127 (such as headlights, interior lights, air conditioning systems, heating systems, audio recording and output systems, sirens, flashing lights, radar gun, license plate reader, video recording and output systems, automatic door operators, and/or any other similar vehicle accessory), battery level monitors that measure the capacity of any batteries in the vehicle 127 and the remaining power left in those batteries, a voltmeter that measures the voltage those batteries, various thermometers that measure the temperature of various components of the vehicle 127 (for example, the temperature of various portions of the batteries, various portions of the motor, the ambient temperature, and any other similar locations), a hygrometer that measures the moisture content of the ambient air and/or the air inside any component of the vehicle 127, a water sensor that may detect the presence of water in and/or around any component of the vehicle 127, and/or any other similar sensors.

The context determiner 154 may analyze each of these sources of data to determine a likely context of the user 130 and the mobile phone 162. The context may indicate the likely activity in which the user 130 is participating, the likely destination of the user 130 and/or the mobile phone 162, the likely path that the user 130 and/or the mobile phone 162 will take to reach the likely destination, events that are likely occurring around the user 130 and/or the mobile phone 162, a crime level of the location of the user 130 and/or the mobile phone 162, and/or any other similar details related to the user 130 and/or the mobile phone 162.

The context determiner 154 may analyze the hub sensor data generated by the hub sensors 148, the device functions 140, the device identifiers 152, the device characteristics 160, public data sources, and/or private data sources. Based on this analysis, the context determiner 154 may determine that the user 130 is likely conducting a traffic stop and that the location of the user 130 and/or the mobile phone 162 has a crime score of three out of ten. This determination may be based on image data captured by the mobile phone 162, the dashboard camera 128, and/or the body camera 132, movement data generated by the sensors of the mobile phone 162, the dashboard camera 128, and/or the body camera 132. This determination may also be based on the movement of the vehicle 127 as well as the movement of the body camera 132 relative to the movement of the vehicle 127. This determination may also be based on the usage of lights and/or sirens and that usage relative to the movement of the vehicle 127, the body camera 132, the user 130, and/or the mobile device 162. This determination may also be based on analysis of public crime data and/or private data that may be related to crime and/or investigations.

The context determiner 154 may generate the context data 155 that indicates the crime score of three out of ten and that the user 130 is likely conducting a traffic stop. The context determiner 154 may provide this context data 155 to the function selector 150. In some implementations, the context determiner 154 may continuously determine the context of the mobile phone 162 and/or any of the connected devices and provide updated context data to the function selector 150. The context determiner 154 may perform this continuous analysis in response to an instruction from the hub controller 138 and may provide updated context data to the function selector 150. The hub controller 138 may later provide an instruction to the context determiner 154 to cease determining the context of the mobile phone 162 and/or any of the connected devices.

In some implementations, the context determiner 154 may be configured to periodically determine the context of the mobile phone 162 and/or any of the connected devices. The context determiner 154 may determine the context data 155 without express instructions from the hub controller 138 and/or any other component of the mobile phone 162 or other device. The context determiner 154 may analyze the hub sensor data generated by the hub sensors 148, the device functions 140, the device identifiers 152, the device characteristics 160, public data sources, and/or private data sources, for example, every fifteen minutes. In some implementations, the context determiner 154 may adjust the frequency of this analysis. For example, if the context determiner 154 receives an indication that the user 130 is off duty, then the context determiner 154 may analyze the hub sensor data generated by the hub sensors 148, the device functions 140, the device identifiers 152, the device characteristics 160, public data sources, and/or private data sources every hour. If the context determiner 154 receives an indication that the user 130 is on duty, then the context determiner 154 may analyze the hub sensor data generated by the hub sensors 148, the device functions 140, the device identifiers 152, the device characteristics 160, public data sources, and/or private data sources every five minutes.

In some implementations, the context determiner 154 may analyze the sensor data generated by the hub sensors 148 and/or the device characteristics 160 to determine the frequency to determine the context data 155. The context determiner 154 may adjust the frequency if the sensor data generated by the hub sensors 148 and/or the device characteristics 160 indicates that the mobile phone 162 is moving at a speed that is greater than a threshold, that a sound that is satisfies a threshold is in the vicinity of the user 130, and/or any other similar sensor data satisfies a threshold. If the connected devices include a firearm holster sensor, then the context determiner 154 may increase the frequency if the user 130 removes the firearm from the holster and/or unbuckles the holster. The context determiner 154 may decrease the frequency if the user 130 returns the firearm to the holster. In some implementations, the user 130 may manually activate one of the connected devices. For example, the user 130 may activate the body camera 132. This activation may cause the context determiner 154 may increase the analysis frequency. If the user 130 manually deactivates the device, then the context determiner 154 may decrease the frequency analysis.

In some implementations, the context determiner 154 may analyze the public and/or private data and determine an event that may indicate to adjust the frequency. For example, the private data may include dispatch data indicating that a firearm was discharged at a specific location. As the user 130 and/or the mobile phone 162 approaches that location, then the context determiner 154 may continuously increase the analysis frequency as the user and/or the mobile phone 162 moves closer to the location.

The function selector 150 may receive the context data 155. The function selector 150 may receive an instruction from the hub controller 138 to determine whether to activate and/or deactivate any of the functions of the devices communicating with the mobile phone 162. In some implementations, the function selector 150 may determine whether to activate and/or deactivate any of the functions of the devices communicating with the mobile phone 162 in response to receiving the context data. The function selector 150 may analyze the device functions 140, the context data 155, and/or the device characteristics 160 to determine whether to activate and/or deactivate any of the device functions.

The process that the function selector 150 may utilize to determine whether to activate and/or deactivate any of the device functions will be discussed in more detail with respect to FIG. 2. To summarize, the function selector 150 may use one or more models and/or rules to analyze the device functions 140, the context data 155, and the device characteristics 160. In some implementations, the function selector 150 may select the rules and/or models based on the context data 155. In some implementations, the function selector 150 may also analyze the hub sensor data generated by the hub sensors 148. In some implementations, the device characteristics 160 may include the dashboard camera sensor data generated by the dashboard camera sensors 112 and/or the body camera sensor data generated by the body camera sensors 166. The rules may specify how to compare the device functions 140, the context data 155, the device characteristics 160, and/or the hub sensor data. The rules may include various thresholds and/or ranges to compare to the device functions 140, the context data 155, the device characteristics 160, and/or the hub sensor data. Based on how those thresholds and/or ranges compare to the device functions 140, the context data 155, the device characteristics 160, and/or the hub sensor data, the rules may specify to activate and/or deactivate specific functions of specific devices. The models may be configured to receive the device functions 140, the context data 155, the device characteristics 160, and/or the hub sensor data and output data indicating which of the functions of the connected devices should be active and/or which of the functions of the connected device should be deactivated.

As illustrated in the example of FIG. 1, the function selector 150 may access the device functions 140, the context data 155, and the device characteristics 160. The device functions 140 may indicate that the dashboard camera 128 is configured to capture video in 1080p and 720p, communicate using Wi-Fi, and communicate using short range radio. The device functions 140 may also indicate that the body camera 132 is configured to capture audio, capture video in 720p, communicate using Wi-Fi, and communicate using short range radio. The device characteristics 160 may indicate that the dashboard camera 128 is located at 123 Elm Street, is facing northwest, is not moving, is sensing ambient light of eight thousand lux, and is receiving constant power. The device characteristics 160 that the body camera 132 is located at 123 Elm Street, is facing northwest, is moving at two miles per hour, is sensing ambient light of seven thousand lux, and has a three thousand milliamp battery with forty percent remaining. The context data 155 may indicate that the user 130 and/or the mobile phone 162 are located in an area with a crime score of three out of ten and the user 130 is likely conducting a traffic stop.

The function selector 150 may analyze each of these sources of data and may apply the rules and/or models. The rules and/or models may specify what functions of the connected devices should be activated, deactivated, and/or allowed to operate normally. A function may operate normally if the device controls and/or a user controls whether a function is active. For example, the video sensor 170 of the body camera 132 may be operating normally if the user 130 manually initiates the body camera 132 to record, which activates the video sensor 170. The function selector 150 may override this operation may instructing the video sensor 170 to remain active or inactive independent of requests from the user 130.

In some implementations, the function selector 150 may determine to activate and/or deactivate more than one function depending on the analysis of the device functions 140, the context data 155, and the device characteristics 160. In some instances, the function selector 150 determines that the context data 155 indicates a high priority, high stress, high danger, and/or other emergent conditions. In this case, the function selector 150 may determine to activate all or nearly all of the functions of the connected devices.

In some implementations, the function selector 150 may determine at what level to activate a function depending on the analysis of the device functions 140, the context data 155, and the device characteristics 160. Various functions may have different levels. For example, video sensors may be configured to capture video different resolutions, framerates, and/or any other similar video capture quality metric. Microphones may be configured to capture video at different bitrates, sampling frequencies, sampling sizes, frequency bands, noise filtering levels, and/or any other similar audio capture quality metric. Lights may be configured to activate at various levels of brightness. Sirens may be configured go activate at various volume levels and various sound patterns. Devices may be configured to utilize different amounts of bandwidth when communicating. If data compression is involved, then the function selector 150 may determine which compression scheme to use, which may include lossy and lossless compression schemes. For example, based on the analysis of the device functions 140, the context data 155, and the device characteristics 160, the function selector 150 may determine to activate the microphone of a radio. The analysis may also indicate for the microphone to capture audio in the three hundred to thirty-four hundred hertz range, at sixteen-bit samples, and to compress the audio using a mp3 compression. As another example, based on the analysis of the device functions 140, the context data 155, and the device characteristics 160, the function selector 150 may determine to activate the spotlight on the vehicle 127. The analysis may also indicate for the brightness of the spotlight to be two hundred lumens. As another example, based on the analysis of the device functions 140, the context data 155, and the device characteristics 160, the function selector 150 may determine for the body camera 132 to output data using Wi-Fi at one megabit per second.

In the example of FIG. 1, the function selector 150 may analyze the device functions 140, the context data 155, and the device characteristics 160. The function selector 150 may determine for the body camera 132 to deactivate the video sensor 170 and for the dashboard camera 128 to activate the 720p video sensor 104 and to deactivate the 180p video sensor 104. The function selector 150 may not determine for the operation of the microphone 172 of the body camera 132 to be different than typical operation.

In stage D, the function selector 150 may generate instructions for the dashboard camera 128 and the body camera 132 based on the determinations from analyzing the device functions 140, the context data 155, and the device characteristics 160. The dashboard camera instruction 126 may indicate for the dashboard camera controller 114 to activate the activate the 720p video sensor 104 and to deactivate the 180p video sensor 104. The body camera instruction 180 may indicate for the body camera controller 168 to deactivate the video sensors 170. The function selector 150 may provide the dashboard camera instruction 126 to the communications interface 146. The communications interface 146 may provide the dashboard camera instruction 126 to the communications interface 116. The communications interface 116 may provide the dashboard camera instruction 126 to the dashboard camera controller 114, which may implement the dashboard camera instruction 126. The function selector 150 may provide the body camera instruction 180 to the communications interface 146. The communications interface 146 may provide the body camera instruction 180 to the communications interface 164. The communications interface 164 may provide the body camera instruction 180 to the body camera camera controller 168, which may implement the body camera instruction 180.

In some implementations, instructions from the function selector 150 may include further details related to the operation of the various functions. The details may indicate that the functions are to remain in the specified state until an override from the user 130 and/or further instructions from the function selector 150. The details may indicate for the devices to communicate with the mobile phone 162 during a change and/or a request for change in the operation of the function. For example, the body camera instruction 180 may indicate for the body camera controller 168 to request permission from the mobile phone 162 to activate the video sensor 170. The mobile phone 162 may confirm that another video sensor is not active with the same field of view as the video sensor 170. If there is no active video sensor in the same field of view, then the mobile phone 162 may permit the video sensor 170 to activate. As another example, the dashboard camera instruction 126 may indicate for the video sensor 104 to notify the mobile phone 162 when there is a during a change and/or a request for change in the operation of the video sensor 104. The dashboard camera instruction 126 for the dashboard camera controller 114 to notify the mobile phone 162 when the video sensor 104 is active and what the resolution is and when the video sensor 104 becomes inactive. The mobile phone 162 may use the information related to the state of the video sensor 104 to determine when to grant permission to the video sensor 170 to activate in response to receiving a request.

The dashboard camera 128, and the body camera 132 may store data indicating the status of their various functions. The dashboard camera 128 may include the function status 120. The function status 120 may be located in a storage device that is accessible by the dashboard camera controller 114 and/or other components of the dashboard camera 128. The function status 120 may include the status of each of the functions of the dashboard camera 128. For example, the function status 120 may include the 720p video sensor status 122 that indicates that the 720p video sensor 104 is active. The function status 120 may include the 1080p video sensor status 123 that indicates that the 1080p video sensor 104 is inactive. In some implementations, the 720p video sensor status 122 and/or the 1080p video sensor status 123 may include additional instructions for determining how the dashboard camera 128 should communicate with the mobile phone 162 during changes in the activation status of the video sensor 104. As noted above, these instructions may indicate for the dashboard camera 128 to provide notification to the mobile phone 162 during changes in the activation status of the video sensor 104

The body camera 132 may include the function status 176. The function status 176 may be located in a storage device that is accessible by the body camera controller 168 and/or other components of the body camera 132. The function status 176 may include the status of each of the functions of the body camera 132. For example, the function status 176 may include the video sensor status 174 that indicates that the video sensor 170 is inactive. In some implementations, the video sensor status 174 may include additional instructions related to when and/or how the body camera controller 168 should communicate with the mobile phone 162 regarding activating the video sensor 170. As noted above, this communication may include requesting permission from the mobile phone 162 in response to receiving a request for activating the video sensor 170 and/or complying with a request to deactivate the video sensor 170. The mobile phone 162 may output a deactivation request for the video sensor 170 if the mobile phone determines that another video sensor with the same field of view if active.

The mobile phone 162 may also store data indicating the status of the component of the devices connected to the mobile phone 162. In addition to data indicating the various function of the connected device, the device functions 140 may also include status data that indicates the current status of the various components. For example, the device functions 140 may include body camera status data that indicates that the status of the microphone 172 and the video sensor 170. The device functions 142 may include dashboard camera status data that indicates the status of the video sensor 104. In some implementations, the device functions 140 may include a real time status of the various components. For example, the dashboard camera status data 144 may indicate that the 720p video sensor 104 is currently active. In some implementations, the device functions 140 may include the instructions provided to the various devices. For example, the body camera status data may indicate that the body camera controller 168 should provide, to the mobile phone 162, a request for permission to activate the video sensor 170. The body camera status data may also indicate that the instructions related to the microphone 172 are for the microphone 172 to operate as expected.

In some implementations, the hub controller 138 may be configured to determine whether the mobile phone 162 should operate as the hub and/or receive instructions to begin or cease operating as the hub. The hub controller 138 may store the status of the mobile phone 162 as the hub. The hub controller 138 may be configured to analyze the context data 155 from the context determiner 154, the sensor data from the hub sensors 148, and/or any other characteristics of the mobile phone 162. These other characteristics may include a remaining capacity of any battery as well as other characteristics such as signal strength of the communications interface 146. In some implementations, the hub controller 138 may be configured to determine which other candidate devices are available to act as the hub. In this case, the hub controller 138 may output requests using the communications interface 146 that request responses from other devices in the vicinity. Based on the responses received, the hub controller 138 may determine whether any of those devices are suitable candidates. In some instances, the hub controller 138 may request data from the candidate devices. The requested data may include data collected from any sensors of the candidate devices and/or any other characteristics of the candidate devices. Based on analyzing the requested data, the context data 155 from the context determiner 154, the sensor data from the hub sensors 148, and/or any other characteristics of the mobile phone 162, the hub controller 138 may determine which device should act as the hub. The hub controller 138 may provide an indication of that determination to the selected device. If the hub controller 138 determines that the mobile phone 162 should remain as the hub, the hub controller 138 may provide an indication of that determination to the candidate devices.

In some implementations, the mobile phone 162 may not be designated as the hub. In this case, the other device that is designated as the hub may perform similar actions as those described above with respect to the mobile phone 162. For example, the other device may manage the functions of various connected devices and/or determine whether another device should operate as the hub.

The mobile phone 162 may include a hub status that indicates whether the mobile phone 162 is operating as the hub. In the example of FIG. 1, the mobile phone 162 is operating as the hub. In this case, the mobile phone hub status may be set to active. If another device is operating as the hub, then the mobile phone hub status may indicate inactive. If the mobile phone hub status is inactive, then the mobile phone 162 may not perform any of the hub related activities such as managing functions of other devices. The mobile phone 162 may also operate as a connected device, such as the dashboard camera 128 and the body camera 132, by communicating with the hub. In this case, the hub may control the functions of the mobile phone 162.

Figure 2:
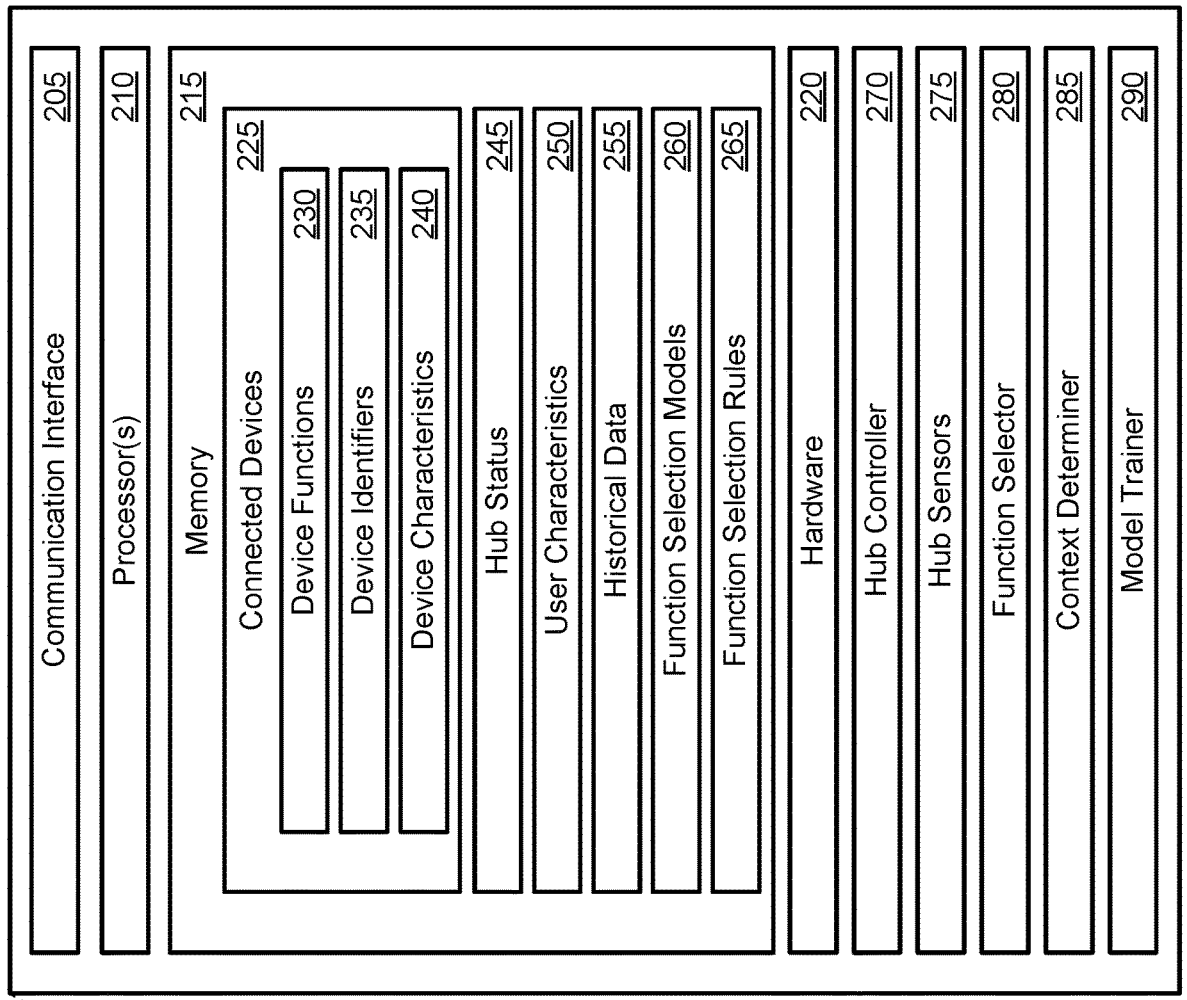
FIG. 2 illustrates an example server that is configured to manage the functionality of various devices.

FIG. 2 illustrates an example device 200 that is configured to manage the functionality of various devices. The device 200 may be any type of computing device that is configured to communicate with other computing devices. The device 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The device 200 may be similar to the mobile phone 162 of FIG. 1. Some of the components of the device may be implemented in a single computing device or distributed over multiple computing devices. Some of the components may be in the form of virtual machines or software containers that are hosted in a cloud in communication with disaggregated storage devices.

The device 200 may include a communication interface 205, one or more processors 210, memory 215, and hardware 220. The communication interface 205 may include communication components that enable the device 200 to transmit data and receive data from other devices and networks. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a hub controller 270. The hub controller 270 may be similar to the hub controller 138 of FIG. 1. The hub controller 270 may be configured to perform multiple tasks. Those tasks may include managing the components of the device 200. For example, the hub controller 270 may instruct the communications interface 205 what type of connection to use to communicate with other devices. The hub controller 270 may instruct the communications interface 205 to communicate with a first device using short range radio and communicate with a second device using a cellular network. The tasks of the hub controller 270 may also include determining whether the device 200 should operate as the hub. The hub may be the device that provides instructions to other devices regarding what functions should be active on those devices and when those functions should be active. If the device 200 is not operating as the hub, then the device 200 may receive instructions regarding what functions of the device should be active and when those functions should be active.

The hub may change between various devices. There may be several devices that are capable of operating as the hub. Each user may have a group of devices with which the user interacts. These devices may make up the personal area network of the user. For example, a police officer may have a radio, body camera, mobile phone, laptop computer, dashboard camera, storage device, watch, tablet, a built-in computer of a vehicle, and/or any other similar device. Only some of these devices may be configured to operate as a hub. The mobile phone, vehicle computer, and/or laptop computer may be capable of operating as the hub. Each of these devices may include a hub controller that is similar to the hub controller 270.

To select the hub, each of the devices may have a series of rules and a hierarchy to determine which device should be the hub and/or determine which devices should not be the hub. The rules may relate to whether each device can detect other devices. The rules may also relate to the characteristics of each device such as the battery capacity. An example rule may indicate that if the hub controller 270 determines that the device 200 can communicate with each of the devices of the user, then the hub should be the device 200 unless the battery capacity is below thirty percent. If the battery capacity is below thirty percent, then the hub should be the built-in computer of the vehicle. Another example rule may indicate that if the hub controller 270 determines that the device 200 can communicate with each of the devices of the user, then the hub should be the built-in computer of the vehicle.

If the device 200 is operating as the hub, then the device 200 may operate as a gateway for communications between the devices and another network. The device 200 or another device acting as the hub may operate as a gateway according to instructions from the function selector 280. For example, the hub controller 270 may instruct a connected device to cease communicating over Wi-Fi and a cellular network and communicate with the device 200 using short range radio. The communications interface 205 may receive the communications from the connected device over short range radio and output the communications using another communications technique to the recipient. Similarly, the communications interface 205 may receive communications intended for the connected device and provide those communications to the connected device over short-range radio.

The status of whether the device 200 is operating as the hub may be located in the hub status 245. The hub status 245 may be located in the memory 215 of the device 200. The hub status 245 may include data indicating whether the device 200 is operating as the hub. If the status data indicates that the device 200 is not operating as the hub, then the hub status 245 may include data identifying the device operating as the hub.

The device 200 may include hub sensors 275. The hub sensors 275 may be similar to the hub sensors 148 of FIG. 1. The hub sensors 275 may include an accelerometer, a gyroscope, a GPS receiver, a barometer, an ambient light sensor, a compass, a gravity sensor, a proximity sensor, a magnetometer, image sensor, video sensor, microphone, hygrometer, water sensor, solar flux sensor, ultraviolet light detector, and/or any other similar sensors. The hub sensors 275 may continuously generate sensors data, generate sensor data in response to an instruction from the hub controller 138, generate sensor data in response to an instruction from another device acting as the hub, generate sensor data periodically, generate sensor data in response to an event such as other sensor data satisfying a threshold, and/or generate sensor data in any other similar instance.

The memory 215 may include the connected devices storage 225. The connected devices storage 225 may be similar to the connected devices storage 158 of FIG. 1. In the case of the device 200 acting as the hub, the device 200 may be managing the connected devices. In the case of the device 200 not acting as the hub, the device 200 may store data related to the devices that the device 200 previously managed when the device 200 was acting as the hub. The connected devices storage 225 may also include instructions received from the hub. These instructions may include how and when to use various functions of the device 200.

The connected devices storage 225 may include the device functions 230, the device identifiers 235, and the device characteristics 240 that may be similar to the device functions 140, the device identifiers 152, and the device characteristics 160 of FIG. 1, respectively. The device identifiers 235 may store an identifier of the devices that the device 200 is configured to manage and identifiers of other devices that may be designated as the hub. The device 200 may mange devices that may later be designated as the hub.

The device characteristics 240 may store data related to the devices included in the device identifiers 235. The device characteristics 240 may include data related to features or qualities of the connected devices that may change over time. This change may occur because of usage of the device, movement of the device, environmental changes, changes in nearby devices, and/or any other similar change. In some implementations, the device characteristics 240 may include sensor data generated by sensors of the connected devices. In some implementations, the connected devices may provide the device characteristics periodically, in response to a request from the device 200, in response to an event, and/or any other similar reason. In some implementations, the device characteristics 240 may be unrelated to changes in the device that may occur because of hardware and/or software changes. In some implementations, the device characteristics 240 may indicate a field of view of the cameras, a sensitivity of a microphone, any low light capabilities of the cameras, noise filtering capabilities of the microphone, and/or any other similar feature.

The device functions 230 may store data related to the devices included in the device identifiers 235. The device functions 230 may be similar to the device functions 140 of FIG. 1. The device functions 230 may include data related to the capabilities of the connected devices that may not change without a modification or addition to the hardware and/or software of the device. The device functions 230 may be related to the communications abilities of the devices, the types of sensors included in the device, and/or any other similar type of capability. The device functions 230 may also include data related to the quality of the functions of each device. For example, if the function is audio capture, then the quality may relate to the bitrate, sampling rate, and/or any other similar quality metric audio capture. If the function is video capture, then the quality may relate to resolution, framerate, and/or any other similar quality metric for video capture. If the function is wireless or wired communications, then the quality may relate to the bandwidth and/or any other similar quality metric for wireless or wired communications.

The device functions 230 may also include instructions for each of the functions for each connected device. The instructions may relate to when the function should be active as specified by the function selector 280 and any other actions that the connected device should take related to that function. Some functions may be controlled by the corresponding device because the function selector 280 has not provided any instructions or the function selector 280 has cancelled previous instructions. For example, a body camera may control its camera as it normally would. The device functions 230 may also include data related to when an instruction was provided to a connected device, whether the connected device confirmed the instruction, whether the connected device appears to be complying with the instruction, and/or any other information related to the functions.

The memory 215 may include user characteristics 255. The user characteristics 255 may include data that describe the type of user who is using the device 200 and the connected devices. The type of user may include an occupation of the user, demographic information of the user, an employer of the user, and/or any other similar information. In some implementations, the user may provide the user characteristics 255 to the device 200. The user may provide the user characteristics 255 in response to prompts from the device 200.

The one or more processors 205 may implement a context determiner 285. The context determiner 285 may be similar to the context determiner 154 of FIG. 1. The context determiner 285 may be configured to determine a context of the device 200 and/or any of the connected devices. The context determiner 285 may be configured to analyze the sensor data generated by the hub sensors 275 and/or sensor data generated by sensors of any of the connected devices.

The context determiner 285 may also be configured to determine events that may be occurring near or around the device 200 and/or connected devices. The context determiner 285 may determine events by analyzing news sources, websites, internet locations with current event information, first responder dispatch feeds, and/or any other similar information source. These sources may include public sources and private sources. In some implementations, the context determiner 285 may access communications between the device 200 and other devices and other communications between the user of the device 200 and other users. The context determiner 285 may analyze these various sources of information and determine the context of the device 200 and/or any connected device.

In some implementations, the context determiner 285 may be configured to select a context from a predetermined list of contexts. This list of contexts may be dependent on the user of the device 200. For example, the list of contexts may be based on the employer of the user. If the user of the device is a police officer, then the list of contexts may be situations in which the user may be involved during the course of performing duties. The list of contexts may be dependent on the position of the user. For example, a list of contexts may be different for a police supervisor than a police officer. In some implementations, the list of contexts may be dependent on the equipment issued to the user. For example, some members of the police may received marked police vehicles and others may unmarked vehicles. These different types of vehicles may include different types of equipment such as different lights and sirens. The list of contexts for these different groups may depend on the differences between these vehicles.

The one or more processors 205 may implement a function selector 280. The function selector 280 may be similar to the function selector 150 of FIG. 1. The function selector 280 may be configured to analyze the device functions 230, the device characteristics 240, the sensor data from the hub sensors 275, the sensor data from the connected devices, the context from the context determiner 285, the user characteristics 250, and/or any other similar data to determine whether any function of the connected devices should operate differently than how that function typically operates. The function selector 280 may use the function selection models 260 and/or the function selection rules 265 to analyze these data sources. The function selection models 260 and/or the function selection rules 265 may output data identifying one or more functions of the connected devices and data indicating how those functions should operate. The function selector 280 may output those instructions to the corresponding connected device.

The function selection rules 265 may include various thresholds, ranges, hierarchies, and/or any other similar comparison tools to determine how the functions of the connected devices should operate. An example rule may specify that if the user is conducting a traffic stop and the crime score for the location of the stop is greater than a threshold, such as five out of ten, then each of the microphones and each of the cameras should be activated. Another example rule may specify that if the user is conducting a traffic stop and the crime score for the location of the traffic stop is less than a threshold, then one camera should be activated. The rule may further specify that if various resolutions of cameras are available, then the resolution to select is further based on the crime score. If the crime score is less than three out of ten, then rule may specify to select a lower resolution that is no lower than 720p. If the crime score is between three and five, then the rule may specify to select a high resolution that is at least 1080p.

As another example, a rule may specify that if the user is within a threshold distance of a gunshot that occurred in the last fifteen minutes, then all functions of the connected devices should be activated. This rule may further specify that if the user manually deactivates a function, then that function should not be reactivated even if the function would automatically be activated based on the current context.

Another example rule may be related to device 200 acting as a communication hub for the connected devices. The rule may state that the connected devices should communicate with the device 200 using short range radio and the device 200 may transmit communications from the connected devices and receive communications for the connected devices. The device 200 may use higher power communications such as cellular communications. In other words, the device 200 acts as a communication hub for the connected devices because the device 200 communicates on behalf of the connected devices.

In some implementations, this communications rule may also include references to the battery power of the connected devices and/or the device 200. For example, the rule may not apply if the battery capacity of the connected device is above sixty percent. As another example, the rule may not apply if the battery capacity of the device 200 is below forty percent. As another example, the rule may apply if the device 200 has a hardwired power supply. As another example, the rule may not apply if the signal strength of the device is below a threshold signal strength. As another example, the rule may indicate that one of the connected devices or the device 200 should operate as the communication hub if one of the connected devices or the device 200 has a signal strength that is above a threshold and the other devices have a signal strength that is below a threshold. This rule may be valid for devices that are capable of communicating with additional devices that the ones that the devices are intended to communicate with.

The function selection models 260 may be configured to receive the device functions 230, the device characteristics 240, the sensor data from the hub sensors 275, the sensor data from the connected devices, the context data from the context determiner 285, the user characteristics 250, and/or any other similar data. The function selection models 260 may output data indicating a function of a connected device to adjust and how to adjust that function. The function selection models 260 may be trained using machine learning and the historical data 255. The historical data 255 may include previous sensor data collected from the hub sensors, previous sensor data collected from the sensors of the connected devices, previous contexts, previous user characteristics, and/or any other similar data. The historical data 255 may also include data related to instances when the device 200 or another hub may have been managing the functions of the connected devices and/or periods when the functions of devices may otherwise be limited or unavailable. The historical data 255 may also include data related to how the user operated the various functions of the connected devices.

The one or more processors 205 may implement the model trainer 290. The model trainer 290 may be configured to analyze the historical data 255. The model trainer 290 may train the function selection models 260 using the historical data 255 and machine learning. The model trainer 290 may generate various data samples based on the historical data 255. Each data sample may indicate the state of the previous sensor data collected from the hub sensors, previous sensor data collected from the sensors of the connected devices, previous contexts, previous user characteristics, and/or any other similar data at a point in time. Each data sample may also include a label that indicates the state of the various functions of the connected devices, how the devices were communicating with each other and/or with other devices and networks, and/or how the user activated the various functions of the devices. The resulting models may be able to receive device functions 230, the device characteristics 240, the sensor data from the hub sensors 275, the sensor data from the connected devices, the context from the context determiner 285, the user characteristics 250, and/or any other similar data and output data indicating which functions should be active or inactive, how the connected devices should communicate with the device 200 and/or with other devices, which device should operate as the hub, and/or any other similar recommendation.

In some implementations, the function selector 280 may implement the recommendation. The model trainer 290 may continue to collect the historical data 255 as the device 200 operates. In this case, the model trainer 290 may update the historical data 255 and retrain the function selection models 260 using the updated historical data 255 and machine learning. The function selector 280 may utilize the updated function selection models 260 to analyze the device functions 230, the device characteristics 240, the sensor data from the hub sensors 275, the sensor data from the connected devices, the context from the context determiner 285, the user characteristics 250, and/or any other similar data that may have updated since the last analysis.

In some implementations, the model trainer 290 may train the function selection models 260 without context data. In this case, the data used by the context determiner 285 may be part of the data samples. In this way, the resulting models may be able to receive device functions 230, the device characteristics 240, the sensor data from the hub sensors 275, the sensor data from the connected devices, the user characteristics 250, and/or any other similar data and output data indicating which functions should be active or inactive, how the connected devices should communicate with the device 200 and/or with other devices, which device should operate as the hub, and/or any other similar recommendation.

The model trainer 290 may also be configured to analyze the historical data 255 and generate the function selection rules 265. The model trainer 290 may analyze the historical data 255 for patterns to identify ranges and threshold and other similar comparison techniques to use to analyze the device functions 230, the device characteristics 240, the sensor data from the hub sensors 275, the sensor data from the connected devices, the context from the context determiner 285, the user characteristics 250, and/or any other similar data. In some implementations, the model trainer 290 may receive goals from a user that the model trainer 290 should try to achieve when generating the function selection rules 265. For example, the goals may include preserving battery life, ensuring image resolution is above a threshold a certain percentage of the time, ensuring the framerate is above a threshold a certain percentage of the time, ensuring audio and video is captured in areas with crime rates above a threshold, and/or any other similar goal. In addition to relating to functions, the function selection rules 265 may be related to selecting a device for a hub. In some implementations, the device 200 may also receive function selection rules 265 from a user. These rules may also be related to specific goals of the user and may be specifically tailored for particular devices.

Figure 3:
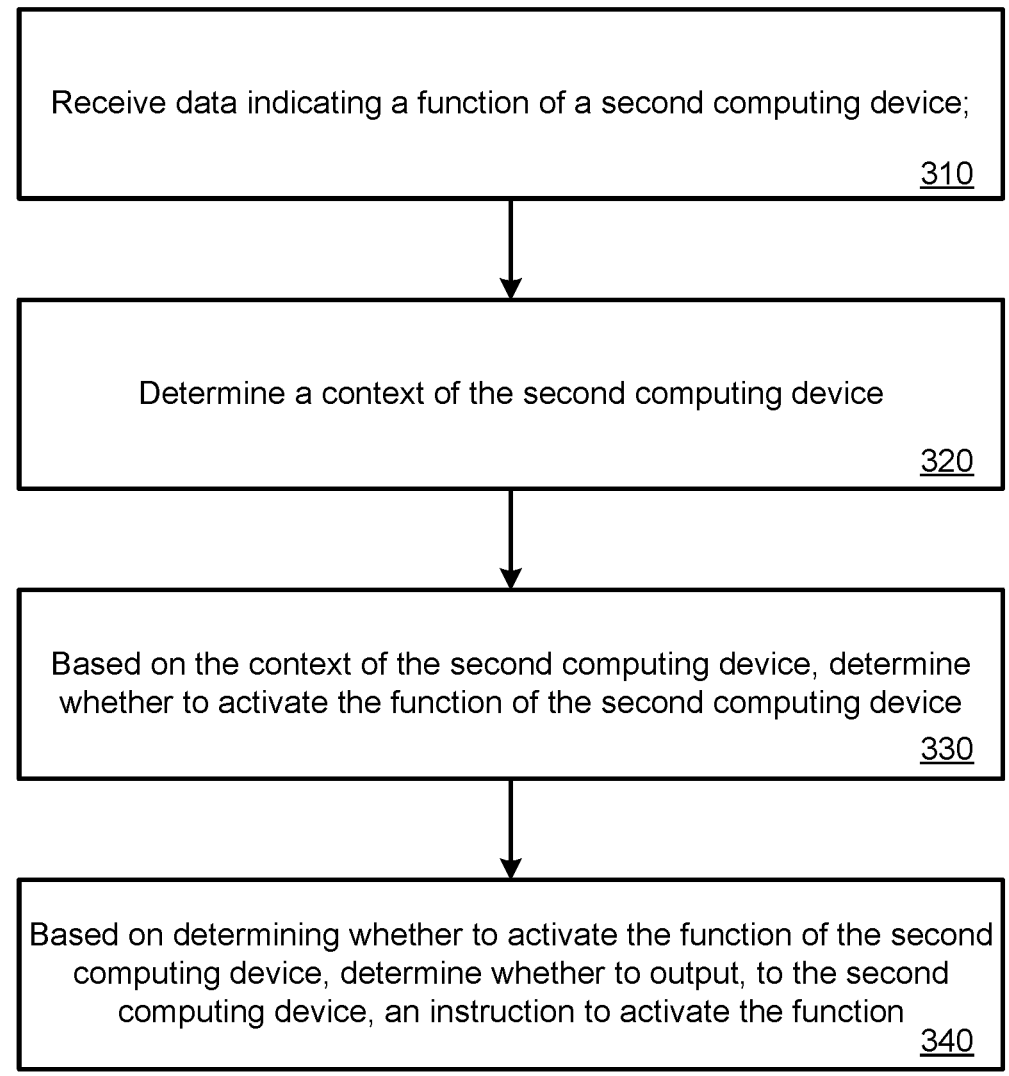
FIG. 3 is a flowchart of an example process for managing the functionality of various devices.

FIG. 3 is a flowchart of an example process 300 for managing the functionality of various devices. In general, the process 300 determines the functions that various devices are capable of performing. The process 300 determines the context of the various devices. Based on the context of the various devices, the process 300 determines whether to activate and/or deactivate any of functions of the various devices. The process 300 will be described as being performed by the mobile phone 162 of FIG. 1 and will include references to other components in FIG. 1. The process 300 may also be performed by the device 200 of FIG. 2.

The mobile phone 162 receives data indicating a function of a second computing device (310). In some implementations, the function may be related to actions that the hardware and/or software of the second computing device can perform. For example, the function may be capturing audio, capturing images, capturing video, communicating using RF communications, communicating using short-range radio, communicating using infrared, communicating using Wi-Fi, communicating using a cellular network, detecting temperature, detecting acceleration, detecting motion, detecting location, detecting pressure, detecting ambient light, detecting cardinal direction, detecting gravity, detecting the proximity of objects, detecting magnetic fields, detecting water, detecting solar flux, detecting ultraviolet light, and/or performing any other similar function. In some implementations, the second computing device may be any type of device that is capable of communicating with the mobile phone 162 and/or other devices.

The mobile phone 162 determines a context of the second computing device (320). The mobile phone 162 may analyze various sources of information to determine the context of the second computing device. The mobile phone 162 may analyze the sensor data collected from the sensors of the second computing device. The mobile phone 162 may also access public sources of information that may relate to news, weather, current event, public crime data, court records, and/or any other similar activity that may be affecting what is occurring in the vicinity of the second computing device. These public sources may include websites available on the internet, public APIs, radio signals, and/or any other similar public data. The mobile phone 162 may also access private data sources. The private data sources may include intranet data related to an employer of the user of the mobile phone 162. For example, the user may be a police officer and the private data may relate information related to ongoing investigations, non-public crime data, and/or any other similar internal police data.

Based on the context of the second computing device, the mobile phone 162 determines whether to activate the function of the second computing device (330). In some implementations, the mobile phone 162 may use various rules and/or models to analyze the context. The rules may specify functions to activate for specific contexts. For example, if the context indicates that the user of the mobile phone 162 is conducting a traffic stop in an area with a crime rate that is below the media crime rate and the functions of the second computing device are audio and video capture, then the rules may indicate to activate the camera of the second computing device. As another example, if the context indicates that the user of the mobile phone 162 is within a threshold distance of a gunshot, then the rules may indicate to activate the microphone and the camera of the second computing device. The models may be configured to receive the context data and function data of the second computing device and output data indicating which functions of second computing device should be activated. For example, a model may receive the context data indicating that the user of the mobile phone 162 is conducting a traffic stop in an area with a crime rate that is above the media crime rate. The model may also receive data indicating that the functions of the second computing device are audio and video capture. The model may output to activate the camera of the second computing device.

In some implementations, the mobile phone 162 may determine the context of the mobile phone 162. In this case, the mobile phone 162 may analyze the context of the mobile phone 162, the context of the second computing device, and the functions of the second computing device using the various rules and/or models. Based on the output of the various rules and/or models, the mobile phone 162 may determine which functions to activate and/or deactivate on the second computing device.

In some implementations, the mobile phone 162 may determine the characteristics of the second computing device. The characteristics of the second computing device may be related to the sensor data collected by the sensors of the second computing device, the different capabilities of the various functions such as video resolution for video capture and audio sampling rate for audio capture, and/or any other similar feature of the second computing device. In some implementations, the characteristics may be related to changes in the second computing device that may be unrelated changes in the hardware and/or software. The mobile phone 162 may analyze the context of the mobile phone 162, the context of the second computing device, and the functions of the second computing device using the various rules and/or models. Based on the output of the various rules and/or models, the mobile phone 162 may determine which functions to activate and/or deactivate on the second computing device.

In some implementations, the mobile phone 162 may receive data indicating the functions of a third computing device and the context of that third computing device. The mobile phone may analyze the context of the second computing device, the context of the third computing device, the functions of the third computing device, and the functions of the second computing device using the various rules and/or models. Based on the output of the various rules and/or models, the mobile phone 162 may determine which functions to activate and/or deactivate on the second computing device and which functions to activate and/or deactivate on the third computing device.

In some implementations, the mobile phone 162 may determine that the second computing device and the third computing device are configured to perform functions that are the same function. For example, both devices may have a microphone that is configured to capture sound and/or a camera that is configured to capture images. The mobile phone 162 may analyze the context of the second computing device, the context of the third computing device, the functions of the third computing device, and the functions of the second computing device, knowing that some of the functions perform the same function, using the various rules and/or models. Based on the output of the various rules and/or models, the mobile phone 162 may determine which functions to activate and/or deactivate on the second computing device and which functions to activate and/or deactivate on the third computing device.

In some implementations, the mobile phone 162 may determine that the functions of the second computing device and the functions of the third computing device that perform the same function, do so at different quality levels. For example, the functions may be video capture. The second computing device may capture video at a resolution of 720p. The third computing device may capture video at 1080p. The mobile phone 162 may further use this quality difference along with the context of the second computing device, the context of the third computing device, the functions of the third computing device, and the functions of the second computing device to determine which functions to activate and/or deactivate on the second computing device and which functions to activate and/or deactivate on the third computing device.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   determining, by a computing device, a function of the computing device;
   determining, by the computing device, that the function is configured to generate function data at a first quality and a second quality;
   determining, by the computing device, a context of the computing device;
   based on the context of the computing device, determining, by the computing device, whether to activate the function to generate the function data at the first quality or the second quality; and
   based on determining whether to activate the function to generate the function data at the first quality or the second quality, activating, by the computing device, the function to generate the function data at the first quality or the second quality.

2. The method of claim 1, comprising:
   determining, by the computing device, an additional context of an additional computing device,
   wherein determining whether to activate the function to generate the function data at the first quality or the second quality is based on the additional context of the additional computing device.

3. The method of claim 1, comprising:
   determining, by the computing device, an additional function of an additional computing device;
   determining, by the computing device, that the additional function is configured to generate additional function data;
   wherein determining whether to activate the function to generate the function data at the first quality or the second quality comprises determining whether to (i) activate the function to generate the function data at the first quality, (ii) activate the function to generate the function data at the second quality, or (iii) activate the additional function to generate the additional function data.

4. The method of claim 3, comprising:
   determining, by the computing device, whether the function data and the additional function data are a same type of data,
   wherein determining whether to (i) activate the function to generate the function data at the first quality, (ii) activate the function to generate the function data at the second quality, or (iii) activate the additional function to generate the additional function data is based on whether the function data and the additional function data are a same type of data.

5. The method of claim 3, comprising:
   determining, by the computing device, characteristics of the additional computing device,
   wherein determining whether to (i) activate the function to generate the function data at the first quality, (ii) activate the function to generate the function data at the second quality, or (iii) activate the additional function to generate the additional function data is based on the characteristics of the additional computing device.

6. The method of claim 1, comprising:
   determining, by the computing device, characteristics of the computing device,
   wherein determining whether to activate the function to generate the function data at the first quality or the second quality is based on the characteristics of the computing device.

7. The method of claim 1, wherein:
   the function data at the first quality is video data with a first video resolution, and
   the function data at the second quality is the video data with a second, different video resolution.

8. A system, comprising:
   one or more processors; and
   memory including a plurality of computer-executable components that are executable by the one or more processors to perform a plurality of actions, the plurality of acts comprising:
   determining, by a computing device, a function of the computing device;
   determining, by the computing device, that the function is configured to generate function data at a first quality and a second quality;
   determining, by the computing device, a context of the computing device;
   based on the context of the computing device, determining, by the computing device, whether to activate the function to generate the function data at the first quality or the second quality; and
   based on determining whether to activate the function to generate the function data at the first quality or the second quality, activating, by the computing device, the function to generate the function data at the first quality or the second quality.

9. The system of claim 8, wherein the plurality of acts comprise:
   determining, by the computing device, an additional context of an additional computing device,
   wherein determining whether to activate the function to generate the function data at the first quality or the second quality is based on the additional context of the additional computing device.

10. The system of claim 8, wherein the plurality of acts comprise:
    determining, by the computing device, an additional function of an additional computing device;
    determining, by the computing device, that the additional function is configured to generate additional function data;
    wherein determining whether to activate the function to generate the function data at the first quality or the second quality comprises determining whether to (i) activate the function to generate the function data at the first quality, (ii) activate the function to generate the function data at the second quality, or (iii) activate the additional function to generate the additional function data.

11. The system of claim 10, wherein the plurality of acts comprise:
   determining, by the computing device, whether the function data and the additional function data are a same type of data,
   wherein determining whether to (i) activate the function to generate the function data at the first quality, (ii) activate the function to generate the function data at the second quality, or (iii) activate the additional function to generate the additional function data is based on whether the function data and the additional function data are a same type of data.

12. The system of claim 10, wherein the plurality of acts comprise:
   determining, by the computing device, characteristics of the additional computing device,
   wherein determining whether to (i) activate the function to generate the function data at the first quality, (ii) activate the function to generate the function data at the second quality, or (iii) activate the additional function to generate the additional function data is based on the characteristics of the additional computing device.

13. The system of claim 8, wherein the plurality of acts comprise:
   determining, by the computing device, characteristics of the computing device,
   wherein determining whether to activate the function to generate the function data at the first quality or the second quality is based on the characteristics of the computing device.

14. The system of claim 8, wherein:
   the function data at the first quality is video data with a first video resolution, and
   the function data at the second quality is the video data with a second, different video resolution.

15. One or more non-transitory computer-readable media of a computing device storing computer-executable instructions that upon execution cause one or more computers to perform acts comprising:
   determining, by a computing device, a function of the computing device;
   determining, by the computing device, that the function is configured to generate function data at a first quality and a second quality;
   determining, by the computing device, a context of the computing device;
   based on the context of the computing device, determining, by the computing device, whether to activate the function to generate the function data at the first quality or the second quality; and
   based on determining whether to activate the function to generate the function data at the first quality or the second quality, activating, by the computing device, the function to generate the function data at the first quality or the second quality.

16. The media of claim 15, wherein the acts comprise:
   determining, by the computing device, an additional context of an additional computing device,
   wherein determining whether to activate the function to generate the function data at the first quality or the second quality is based on the additional context of the additional computing device.

17. The media of claim 15, wherein the acts comprise:
   determining, by the computing device, an additional function of an additional computing device;
   determining, by the computing device, that the additional function is configured to generate additional function data;
   wherein determining whether to activate the function to generate the function data at the first quality or the second quality comprises determining whether to (i) activate the function to generate the function data at the first quality, (ii) activate the function to generate the function data at the second quality, or (iii) activate the additional function to generate the additional function data.

18. The media of claim 17, wherein the acts comprise:
   determining, by the computing device, whether the function data and the additional function data are a same type of data,
   wherein determining whether to (i) activate the function to generate the function data at the first quality, (ii) activate the function to generate the function data at the second quality, or (iii) activate the additional function to generate the additional function data is based on whether the function data and the additional function data are a same type of data.

19. The media of claim 15, wherein the acts comprise:
   determining, by the computing device, characteristics of the computing device,
   wherein determining whether to activate the function to generate the function data at the first quality or the second quality is based on the characteristics of the computing device.

20. The media of claim 15, wherein:
   the function data at the first quality is video data with a first video resolution, and
   the function data at the second quality is the video data with a second, different video resolution.

* * * * *